July 26, 1960     P. C. HUNGERFORD, JR     2,946,417
BIDIRECTIONAL NO-BACK COUPLINGS
Filed Dec. 16, 1957     2 Sheets-Sheet 1

INVENTOR.
PHILIP C. HUNGERFORD JR
BY George M Soule
ATTORNEY

July 26, 1960   P. C. HUNGERFORD, JR   2,946,417
BIDIRECTIONAL NO-BACK COUPLINGS
Filed Dec. 16, 1957   2 Sheets-Sheet 2

INVENTOR.
PHILIP C. HUNGERFORD JR
BY George M. Soule
ATTORNEY

United States Patent Office 2,946,417
Patented July 26, 1960

2,946,417
BIDIRECTIONAL NO-BACK COUPLINGS

Philip C. Hungerford, Jr., Cleveland Heights, Ohio, assignor to Curtiss-Wright Corporation, a corporation of Delaware Filed Dec. 16, 1957, Ser. No. 702,846

11 Claims. (Cl. 192—8)

This application is a continuation in part of application Serial No. 694,956 by G. E. Bevis and P. C. Hungerford, Jr. filed November 7, 1957, entitled Steering Mechanisms and the Like, now Patent No. 2,927,551.

The present invention relates to a bidirectional no-back coupling mechanism of the type employing self-energizing helical friction spring coils operable as brake elements against a stationary drum so as to be capable of enabling transmission of torque as from a control shaft to a load while effectually preventing back drive bidirectionally as from the load to the control shaft. One important object of the invention is to provide a simple and inexpensive high torque transmitting bidirectional no-back coupling operable with substantially zero backlash in a direction from the output element or shaft of the coupling toward its input element or shaft and which can be easily adjusted during assembly so as to have substantially minimum backlash in the opposite direction, i.e. from input toward output, and with assurance of trouble free operation after assembly.

In order for a bidirectional no-back coupling employing self-energizing helical friction braking spring coils to operate with substantially zero backlash in the output toward input direction, it is practically necessary to provide two helical springs connected to the output element of the coupling for frictional locking thereof respectively in opposite rotational directions, and to provide a lost motion or free play torque transmitting connection between the input and output elements which, as a function of taking up of the free play by operation of the input element in either direction, will be certain to deenergize one of the springs. Manufacture of such couplings in quantity production normally involves maintenance of extremely close tolerances in the dimensions of springs and coacting drum surfaces and in the angular relationships of actuating and release shoulders of each of the springs, assuming accuracy of operation is to be assured under all circumstances and that undesired backlash or free play in the input toward output direction or vice versa is to be minimized. The present construction, indicating a further object, enables compensation for the cumulative effects of tolerance variations to be effected during assembly while maintaining manufacturing and assembly cost at a practical minimum. A further object is to provide a substantially tamper proof bidirectional no-back unit with provision for such compensation as just above mentioned.

Other objects and features of the invention will become apparent from the following description of the preferred forms as shown in the drawings. The essential characteristics are summarized in the claims.

In the drawings, Fig. 1 is a longitudinal sectional assembly view of the present coupling in one form (A), taken diametrally of the common axis of the input and output elements of the coupling. Fig. 2 is a transverse sectional view taken along the line 2—2 on Fig. 1 showing the spring deenergizing means and the positive driving connections between the input and output members of the coupling. Fig. 3 is a further transverse sectional view taken at 3—3 on Fig. 1 showing one manner of securing the helical springs to output portions of the coupling. Fig. 4 is a fragmentary perspective view of an input and output shaft sub-assembly of the coupling A. Fig. 5 is a fragmentary bottom plan and partially sectional view (same form) showing the preferred lost motion or limited angular movement connection between the input and output shafts. Fig. 6 is an enlarged sectional detail view corresponding to the lower left hand portion of Fig. 1.

Figure 1:
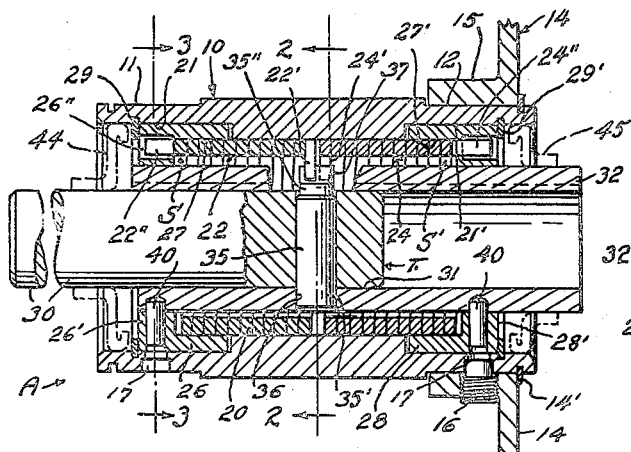

Referring to Fig. 1, 10 indicates a suitable generally cylindrical housing of coupling unit A which is symmetrical end for end and provided with external reduced diameter cylindrical surfaces 11 and 12 adapted interchangeably to receive a mounting flange device such as shown at 14 whereby the coupling may be secured to a piece of machinery such as the steering gear, for example, of a vehicle such as a tractor or boat in which anti-back drive operation is desirable.

Collar portion 15 of the mounting flange device 14 is internally bored to slip over one of the surfaces 11 or 12 and be secured in place against turning relative to the housing 10 as by radially releasible pins and/or screws, one shown at 16. The pins 16 engage respective radial holes or sockets 17 in the housing 10 which holes also serve another purpose as will be described later. When the pins 16 are withdrawn from the holes 17, the no-back coupling is rendered inoperative as such since the normally stationary housing 10 is then free to turn relative to while being supported by the mounting flange device 14. The flange device may be demountably retained on the housing by a snap ring 14'.

The interior of the housing 10, at a generally central thickened wall portion thereof, has a main through bore 20 providing a brake drum surface for coaction with associated coil portions of two helical springs 22 and 24. The springs are identical in construction and similarly wound. Additionally, the interior of the housing is counterbored from opposite ends at 21 and 21' for receiving collars or hubs 26 and 28 operatingly attached to respective springs 22 and 24 as will be described. The collars 26 and 28 turn freely in the counterbores 21 and 21' and may be secured in place as by snap rings 29 and 29' seated in conventional grooves intersecting the counterbores 21 and 21'. Actually the snap rings are unnecessary in the construction according to Fig. 1 since, as will appear later, the unit A is self-contained without them. The helical springs 22 and 24 are preloaded (interference fitted) against the various drum surfaces 20, 27 and 27' so that each spring is self-energizing to grip the drum surface 20 in one direction in a manner well known to the art.

The input element or member of the coupling is shown in the form of a shaft 30 supported for angular movement in a bore 31 of a tubular output element or member 32 which is maintained coaxially of the housing 10 through bearing support in axial bores of annular end wall portions 26' and 28' of the collars or hubs 26 and 28.

Figure 5:
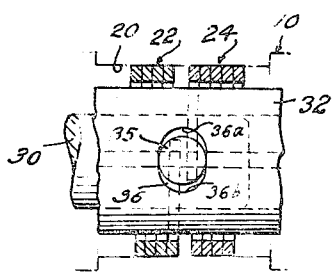

As a two-way torque transmitting lost motion positive connection between the input and output members 30 and 32, the input member carries (e.g. press fitted in a transverse bore thereof) a cross pin 35. The two end portions 35' and 35" of the pin 35 project radially outwardly from the outer peripheral surface of the input member 30 and occupy circumferentially elongated slots or openings 36 and 36' in the wall portions of the tubular output member 32. The slots are of sufficiently greater width than the larger diameter portion of the cross pin, so as to permit free angular limited relative movement between the input and output members. The shape of slot 36 is shown in Fig. 5.

Figure 2:
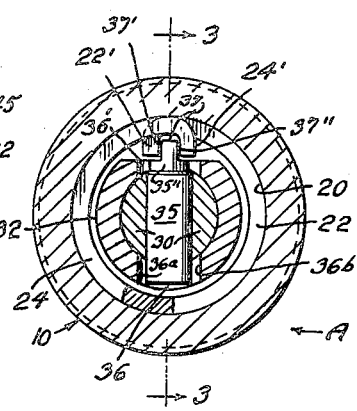
Figure 4:
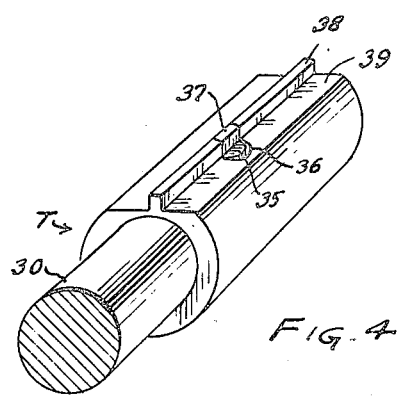

As will be evident from comparison of Figs. 1, 2 and 4, the upper cylindrical portion 35" of the pin 35 is of relatively reduced diameter and, upwardly beyond the portion 35", the pin has an end portion 37 with flat sides parallel to the operating axis of the coupling and providing spring deenergizing shoulders 37' and 37". Further, as shown in Fig. 2, the free end portions of the helical springs 22 and 24 have (e.g.) inwardly bent toes 22' and 24' providing opposed shoulders which lie on opposite sides of the end portion 37 of the cross pin 35. Thereby any relative angular movement between the input member 30 and the output member 32 out of the normal or neutral angular relationship shown by Fig. 2, by torque applied to the input member, will commence to cause deenergization of one helical spring or the other so that the spring can be easily slid circumferentially on the brake drum surface 20 of housing 10, as is equal in no-back couplings employing helical springs. The other helical spring meanwhile is caused to overrun in the housing through connection with the output member, as is usual. The design is such that as soon as sufficient angular movement of the input member to effect the required spring deenergization has assuredly taken place, the shank or lower end portion 35' of the pin 35 (as shown in Fig. 2) will abut either the surface 36a or 36b of the circumferentially elongated slot 36 in the output member 32 for accomplishing positive drive of the output member in the desired direction. The upper reduced diameter portion 35" of the pin 35 will always be out of contact with the end walls of its associated slot portion 36' which, for convenience of manufacture, has generally the same dimensions as slot 36.

When the cross pin 35 is pressed into place, its top end portion (not illustrated) is wholly of the same reduced diameter as shown at 35", Fig. 2. Material is later removed from each side of the top end cylindrical portion of the pin to form the spring deenergizing shoulders 37' and 37" as will be described below. The self contained input and output shaft assembly (Fig. 4) constituted by parts 30, 32 and 35 will be hereinafter referred to for convenience as sub-assembly T.

The collars or hubs 26 and 28 are connected to the relatively outward or axially opposite end coils of the helical springs 22 and 24 in a manner to prevent relative angular movement between the associated spring end coils and the collars, thereby, in cooperation with the preloading of adjacent coils in the collars, constituting unitary sub-assemblies S and S', Fig. 1. As shown, axially extending toes 22" and 24" on the respective springs enter operatingly complementary axial bores or sockets 26" and 28" in the annular wall portions 26' and 28' of respective collars. The preloading of coils of the springs 22 and 24 in the collars 26 and 28 which, as described later, are fastener to the output member 32 and relieve the toes from having to transmit more than negligible torque.

Figure 3:
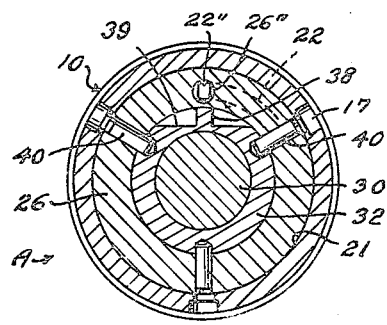
Figure 6:
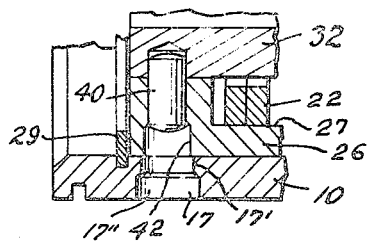

In order to fasten the collars 26 and 28 to the output member 32 with the relatively adjacent, spring deenergizing, toe portions 22' and 24' of the two springs in the desired relationship to the shoulders 37' and 37" of the cross pin 30, or as shown in Fig. 2, the collars are secured by (e.g.) radial pins 40, Figs. 1 and 3, to respective portions of the output member 32 after the spring and collar assemblies S and S' are in place in the housing 10, and after the assembly T, Fig. 4, is in operating relationship to the spring and collar assemblies. This requires that the materials selected for the output member 32 and the collars 26 and 28 shall be capable of being drilled after assembly. Preformed openings 17 in the walls of the housing 10 which preferably comprises hardened steel to provide adequate wear resistance for drum surface 20, serve as drill or tool guides in the operation of forming the necessary holes for the pins 40. Since the springs 22 and 24 stay in fixed angular relationship to the collars 26 and 28 (no overrun of spring coils thereon) the collars can be quite soft (e.g. sintered metal, finish formed in suitable dies). Output member 32 is preferably cold rolled steel or similar material selected for toughness and strength. The tool-pilot openings 17 have bore portions 17' slightly larger in diameter than the holes for the pins 40 and, additionally, counterbore portions 17" as best shown in Fig. 6. In order to guard against the possibility of the operation of inserting the pins 40 resulting in local enlargement of the collars 26 and 28, so that the collars will not turn freely in the counterbores 21 and 21' of the housing 10, each collar 26 and 28 is preferably formed with a counterbore as at 42 (Fig. 6 only), using a suitably stepped tool in drilling for the pins 40.

Referring to Figs. 2 and 4, the construction of the output member 32 and cross pin 35 is such as to enable the spring deenergizing toe portions 22' and 24' to be of considerable radial extent inwardly away from the coil portions of the springs notwithstanding the fact that the tubular portion of the output member 32 (for conservation of radial space) is only slightly smaller in diameter than the internal or non-gripping surface portions of the helical springs. After insertion of the cross pin 35 to permanently interconnect the input and output members 30 and 32 as already described, the shank portion 35' of the pin 35 is accurately located centrally of the elongated slot 36, Figs. 2 and 5, i.e. with opposite side portions of the pin at equal distances from the shoulders 36a and 36b, as by the use of gauge pins in a suitable holding jig for the parts. Then generally triangular portions (not shown) of the output member 32 are cut away, as by milling or broaching operations, so as to leave a rib 38 aligned with the axis of the cross pin 35 and to provide coplanar flat faces 39 at opposite sides of the rib inwardly from the inner peripheral surfaces of the springs 22 and 24. The cutting operations just described form the side faces or spring deenergizing shoulders 37' and 37" on the cross pin 35 in very accurate angular relationship to the axis of the cross pin.

In assembling the no-back coupling mechanism A, the two sub-assemblies S and S' comprising the helical springs 22 and 24 and associated collars 26 and 28 are first inserted into their illustrated positions (Fig. 1) in the housing by turning the springs (through manipulation of the collars) in their overrunning directions relative to the drum or bore surface 20. Then by the use of a suitable gauge, the toe portions 22' and 24' of the two springs 22 and 24 are then located with their inner faces slightly wider apart than necessary in order to receive the spring deenergizing projection 37 of the cross pin 35 between them. The assembly T comprising the input member 30, output member 32 and cross pin 35 can then be slid into place from either end of the housing. The rib 38 serves as a pilot in either case to guide the projection 37 into place between the previously positioned spring toes 22' and 24'. The snap rings 29 and 29' (if used) are preferably inserted into their grooves of the housing 10 before the drilling operations for the pins 40 are commenced, thereby to enable the workman to ascertain that the collars 26 and 28 have been so formed as to turn freely in the housing. The collars 26 and 28 are then permanently fastened to the associated portions of the output member 32 as already described. Incidentally, if the toes 22' and 24' (Fig. 2) are set too close to each other during assembly, and thereby the deenergizing pin portion 37 has to be forced between the toes, then the antirotational or locking capacity of the springs will be undesirably limited by precontraction of the springs or before operational movement of the input member out of its neutral position, Fig. 2, commences to take place. One manner of insuring that, during assembly, the deenergizing shoulders or toes 22' and 24' of the springs will be properly located relative to the deenergizing shoulders of cross pin 35 is to provide hardened, precision gage strips (not shown) on opposite sides of the rib 38 and pin portion 37 when the shaft assembly T is inserted into position. In that case the toes 22' and 24' can be quite wide apart before the assembly T is inserted into the housing. Then by turning the spring and collar assemblies S and S' (as by spanner wrenches engaging respective mating axial sockets in the collars) in relatively opposite directions (springs overrunning on drum surface 20) the toes are brought into tight contact with the gauge strips. The collars 26 and 28 are then pinned in place, as already described, after which the gage strips are withdrawn from between the spring toes and cross pin projection 37 and removed from the housing 10.

It will be evident from the above that, in the coupling A, the slack or backlash takeup arrangement for each spring 22 and 24 includes means (pin portion 37) connected with one of the input and output members (input 30 as shown) operative on a coil at one end of each spring (e.g. at 22') as a function of predetermined relative angular movement enabled by the described pin and slot connection device shown in Figs. 2 and 5 to de-energize the spring, means (adjusting ring or collar 26 or 28) connected with the other of the input and output members (output member 32 as shown) and capable of connecting the opposite end of the spring (e.g. at 22") thereto against angular movement in opposite directions, each adjusting ring or collar, during assembly of the coupling, being freely turnable on the associated member (32) and at such time being accessibly exposed for angular adjustment thereon, and a cooperating fastening device (e.g. pins 40) simultaneously accessibly exposed and operating during and after assembly to secure the ring or collar to such member (32) against angular movement in either direction. The arrangement can be reversed (input for output in respect to the spring connected members) without essential change in operation, as will be shown later in connection with Figs. 10 and 11.

From an operational standpoint, fasteners (serving in place of radial pins 40) could just as well enter (e.g.) axial openings drilled into the collars 26, 27 and associated portions of the outpu tmember 32 (not illustrated). If, however, the input and output members 30 and 32 have to extend out of the housing 10 as is usually desirable (e.g. as shown in Fig. 1) and compactness radially of the assembly is important for any reason, then it is difficult to provide operational room for the necessary tools and/or to provide such exposed surface relationships axially of the assembly as will enable fastening of the parts as by pins or the like service in place of pins 40 whose axes extend parallel to the operational axis of the coupling A or in some direction other than radially thereof. In any event, the essential relationship of the securing pins or their equivalents to the cooperating parts is one in which the (e.g.) pins 40 are in bidirectional abutment circumferentially of the assembly generally with cooperating oppositely circumferentially disposed surface portions of the collars 26 and 28 and the output member 32.

After assembly, and during operation of the coupling, unless input torque is being transmitted by turning of the shaft 30, the helical springs 22 and 24 operate through their deenergizing toes 22' and 24' on one or the other of the release shoulders 37' and 37" to hold the cross pin 35, hence the input shaft 30 in neutral position (e.g. relationship of parts as shown in Fig. 2).

In installations of the present coupling for marine use it is, of course, necessary to exclude salt water. After completion of assembly, as described above, the two ends of the housing 10 are preferably provided with annular seals (e.g. elastomer) as indicated for example by dot and dash lines at 44 and 45. Seal 45 may be moulded to fit the associated non-circular surface portions of shaft 32 or may be extended around the end of that shaft (not illustrated).

During operation of the present coupling A there is substantially no backlash between the output member 32 and the relatively outer ends of the helical springs 22 and 24; and also the initial turning movement of the input shaft 30 from its normal or arrested position, Fig. 2, will be certain to release one spring or the other, depending upon the direction of rotation of the input shaft, and before the torque transmitting abutment occurs between the cross pink shank portion 35' and either of the abutment shoulders 36a or 36b in the output member 32 regardless of how much variation there may be in the angular relationship of the toes on the ends of either spring when the spring is contracted the necessary amount in diameter to permit it to be inserted into preloaded relationship to the drum surface 20 of the housing 10. Thus the construction including, for example, the pins 40 and their cooperating radial bores in the collars or hubs 26 and 28 and output member 32 provides a very simple way of compensating for the cumulative effects of dimensional variations as earlier referred to by enabling the person who assembles the unit to predetermine the angular relative position of the input and output members at which deenergizing of the necessary one of the helical springs 22 and 24 will commence to take place in either direction of operation of the input member. The effective compensating adjustment in the case of coupling A is one that cannot be tampered with and one that cannot slip or move out of position in service.

Figure 7:
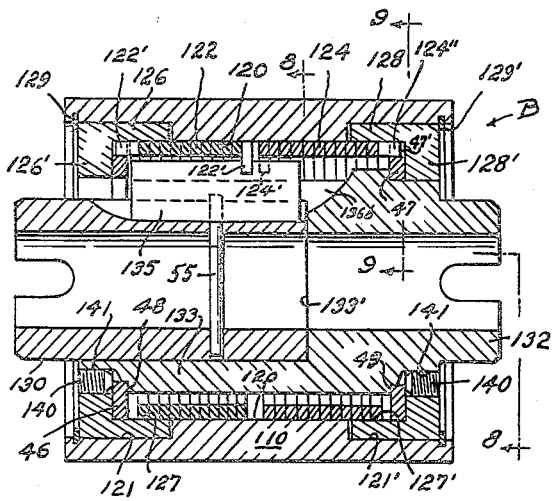
Fig. 7 is a view corresponding to Fig. 1 showing a second form (B).
Figure 8:
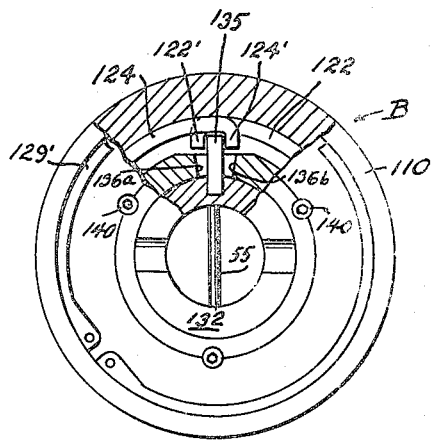
Figs. 8 and 9 are fragmentary sectional views taken as indicated at 8—8 and 9—9 respectively on Fig. 7.
Figure 9:
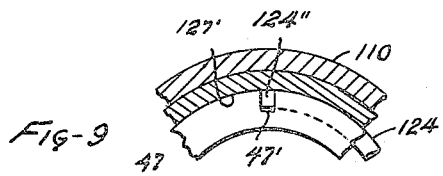

Referring to Figs. 7, 8 and 9, the no-back coupling unit B is operationally the same as coupling A, and the corresponding parts, so far as the construction of unit B is essentially the same as already described, are given the same reference characters plus 100.

The input and output members 130 and 132, as shown in Fig. 7, are both tubular, and the output member 132 has a relatively enlarged diameter head portion 133 wholly inside the housing 110. Collars or hubs 126 and 128 are secured, as by snap rings 129 and 129', to turn freely in the counterbore surfaces 121 and 121' of the housing; and end wall or disc portions 126' and 128' of the collars are bored to afford radial support for end portions of the head 133 coaxially of the housing as will be apparent.

Situated between the wall portions 126' and 128' of the collars 126 and 128 respectively are flat spring anchoring rings 46 and 47, freely turnable in the internal drum surfaces 127 and 127'. The rings abut axial surfaces 48 and 49 respectively, formed on the head portion 133 of output member 132.

The rings 46 and 47 are identical and have radial slots 46' and 47' (see Fig. 9), which receive axial toe portions 122" and 124" of the respective helical springs 122 and 124. Screws 140 in threaded openings 141 formed partly in the head portion 133 of output member 132 and partly in respective collars 126 and 128 lock the collars to said head portion 133 and, additionally, clamp the rings against the shoulders 48 and 49, thereby to hold the associated end coils of the springs 122 and 124 in fixed position on the output member.

As shown by Figs. 7 and 8 the input member 130 is suitably secured in a counterbore of the tubular output member 132 in approximate abutment with the effective bottom surface 133' of the counterbore. Provision for limited angular movement between the input member 130 and output member 132, necessary to deenergize the helical springs 122 and 124 includes a key 135 fitted in a slot 135' of the input member 130 and secured thereto as by a diametrally located pin 55. The radially outward portion of the key 135 beyond the slot 135' lies between relatively angularly disposed driving shoulder surfaces 136a and 136b (Fig. 8) of the output member head 133 which shoulders are wider apart than the circumferential width of the key 135. The slot in the wall of the output member head portion 133 which provides the shoulder surfaces 136a and 136b may be only slightly longer axially of the assembly than is the key (not so shown) so as to hold the input member against movement to the left (Fig. 7) out of position in the counterbore of the output member 132. As shown in Fig. 7 however, the key 135, for that purpose, extends far enough toward the left to be close to ring 46 in the normal operation of the coupling B. The key 135 (see Fig. 8), extends radially outwardly beyond the head 133 into position between inwardly extending toes or lugs 122' and 124' of the springs 122 and 124 respectively. By circumferential adjustment of the springs 122 and 124 during assembly of the coupling B, as will be described later, the toes or lugs are capable of being maintained always in substantial abutment with the key 135 so that any angular movement of the input member 130 out of its neutral position, Fig. 8, will commence to deenergize one of the helical springs.

The operation of coupling B for enabling transmission of torque bidirectionally therethrough from input to output while blocking back drive, and with substantially zero backlash in the output toward input direction, is essentially the same as described in connection with coupling A.

The collars 126 and 128 which turn freely in contact with the counterbore surfaces 121 and 121' of the housing 110 are always forced to turn with the associated coils of the springs 122 and 124 during torque transmission by means of the coupling B. Thus all the necessary overrunning or sliding of the outer or gripping surfaces of the springs 122 and 124 is limited to the coils of the springs associated with the fixed drum surface 120, and the spring toes or shoulders at the output ends of the springs are thereby safeguarded from subjection to strains during operation of the coupling. The input end toes 122' and 124' are never subjected to more than the small forces necessary to deenergize the springs in respect to fixed drum surface 120.

The screws 140 are inserted during final assembly of the various components illustrated in Fig. 7, i.e. after the input member 130 is in place and the springs 122 and 124 and their associated rings 46 and 47 have been fully inserted into operating position and the rings 46 and 47 have been turned in the overrunning direction of the springs to bring the spring toes 122' and 124' into close relationship to the key 135. Preferably the collars 126 and 128 are inserted into the counterbores 121 and 121' after the springs 122 and 124 and their associated rings 46 and 47 are in final position and the toes 122' and 124' have been brought close to the key 135 as shown in Fig. 8. Such operation of inserting the collars requires turning of the collars in peripheral overrunning contact with the springs 122 and 124 i.e. in directions tending to contract the springs, which directions of turning do not tend to disturb the operating abutment relationships between toes 122' and 124' and the key 135. The collars 126 and 128, when seated against the associated rings (46 or 47) are further turned, in the same directions as just mentioned, to align the complementary portions of the various threaded openings 141; and then the screws 140 are inserted and driven tightly against the associated rings 46 and 47 to anchor the helical springs to the output member 132 against any possibility of angular displacement relative thereto. The screws 140 are preferably "staked" in place and, if desired, the exposed ends of the screw holes may be plugged (not illustrated). The final operations at each end of the assembly shown in Fig. 7 is to secure the collars 126 and 128 in place, as by the snap rings 129 and 129'.

It will be apparent from the above that, during formation of the components (either illustrated form of coupling), about the only dimensional relationship necessary to maintain within relatively close limits is spring diameter vs. cooperating drum diameters, since the critical angular relationships of shoulders is or can be easily adjusted and securely fixed during assembly, as described. In coupling A (Fig. 1) the adjustment means are tamperproof, which is highly desirable in low cost relatively small units designed for relatively low torque capacity. In designing for high torque, all the components are necessarily larger hence more expensive and then, as by employment of the adjustment means of coupling B, Fig. 7, inspection and replacement of worn or damaged parts is easily accomplishable in the field by capable service personnel.

Figure 10:
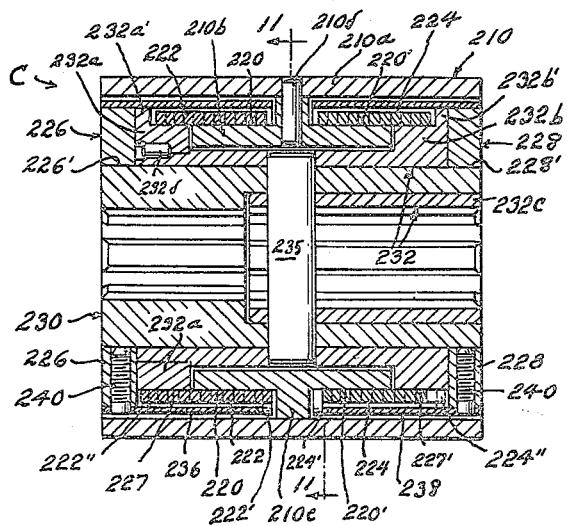
Fig. 10 is a longitudinal central sectional view of a third form of bidirectional no-back coupling (C) hereof, designed especially for high speed operation and with contracting type helical friction springs.
Figure 11:
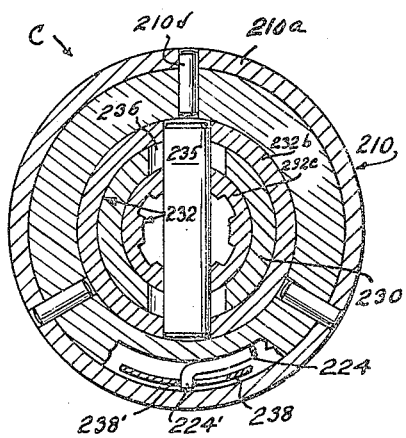
Fig. 11 is a transverse sectional view of coupling C, taken as at 11—11 on Fig. 10.

Figs. 10 and 11 show an arrangement of coupling (form C) adapted for relatively high speed operation and wherein, instead of providing slack adjusting collars (or adjusting collar assemblies) between the helical springs and the output member, operatingly similar collars 226 and 228 Fig. 10, carrying deenergizing sleeves 236 and 238 for the helical springs 222 and 224, are freely angularly movable on respective circular surfaces 226' and 228' respectively of the input member 230 during assembly of the coupling C, and are locked to the input member 230 after the helical springs have been fully seated on their cooperating drums, thus establishing the angular relationships of shoulders necessary for trouble-free operation with approximately minimum backlash.

The helical springs 222 and 224 are of the contracting to grip type, and have anchored end coils preloaded on circular hub or drum surface portions 227 and 227' of the output member assembly 232. Those surface portions are of approximately the same diameters as the stationary drum surfaces 220 and 220' of composite drum assembly 210 and on which the free end coils of the springs are preloaded during assembly of the coupling.

Stationary drum assembly 210 has an outer sleeve part 210a and an inner sleeve part 210b, concentric therewith, on which latter part the external drum surfaces 220 and 220' are formed. Inner sleeve part 210b is supported by an axially central rib portion 210c of inner sleeve part, over which rib the outer sleeve part for connection with any fixed portion of the machine served by the coupling can be slipped as a final assembly operation, and secured as by radial drive pins 210d in preformed radial openings or openings drilled during final assembly, as desired.

The output member assembly 232, as shown, is made of three sleeve parts: 232a and 232b (supporting the external drum surfaces 227 and 227' respectively) and an inner shaft adapted sleeve part 232c. These parts are interconnected by a cross pin 235 in circular diametral openings formed in parts 232b and 232c. The limited angular lost motion positive connection between the input and output members comprises, in part, circumferentially elongated openings or slots 236 in the input member walls as best shown by Fig. 11 and which receive corresponding portions of cross pin 235. Part 232a of the output member 232 is a collar fitting the left end reduced or stepped portion of part 232b and which can be secured by axial drive pins 232d (one shown) to the part 232b after the helical springs and the components of input and output member assembly (corresponding to subassembly T Fig. 1) are in assembled relationship to each other and in respect to the inner stationary drum part 210b.

The helical springs 222 and 224 are anchored at radial slots in end flange or rib portions 232a' and 232b' of the output member parts via axial toes 222'' and 224'' of the springs. Slots in the inner end portions of the deenergizer sleeves 236 and 238 provide deenergizing shoulders, one shown at 238', Fig. 11, which engage outwardly extending radial toes 222' and 224' on the free ends of respective helical springs 222 and 224. Each slot (providing a shoulder 236'—not shown—or a shoulder 238') is formed with adequate clearance opposite the deenergizing shoulder and with respect to the associated spring toe 222' or 224' (see Fig. 11) such that, when the sleeves 236 and 238 are turned unitarily, via collars 226 and 228, by the input member 230 in the direction and through the distance required to deenergize one of the springs 222 or 224 the other sleeve will not make any contact with the toe of its associated spring such as would prevent free overrunning of the latter spring on its coacting stationary drum surface.

In the construction according to Fig. 10 the backlash takeup collars 226 and 228 are radially threaded to receive set screws 240, and the head portions of the screws extend through radial openings in respective spring deenergizing sleeves 236 and 238 to secure those sleeves to the collars for angular movement therewith. There may be any number of set screws 240 (e.g. three at each end of coupling C).

When all the parts, as shown by Fig. 10, except the outer stationary drum member or housing 210a and its pins 210d, are in assembled relationship (but while the collars 226 and 228 are still free to turn for final adjustment on the circular surfaces 226' and 228' of the input member 230), the shoulders 236' and 238' of the deenergizer sleeves 236 and 238, can be individually turned by manipulation of the collar and sleeve assemblies into proper relationship to the spring toes 222' and 224' which are, at that time, fully exposed to view. The collars 226 and 228 with their respective sleeves are then fastened in position on the input member 230 by the set screws 240 as will be evident. Thereafter the operatively unitary sub-assembly generally described above, including the inner drum member 210b, is slipped into the housing or outer drum member 210a and the two drum members are then fastened together by the pins 210d, completing the assembly operation.

The coupling C is well adapted for high speed operation because centrifugal force acting on the free end coils of the springs 222 and 224 which overrun on the fixed external drum surfaces 220 and 220' during torque transmission through the coupling C cannot tend to produce excessive overrunning drag but instead can, by design, reduce overrunning drag to negligible values at predetermined speeds. Otherwise the operation of coupling C is the same as earlier described in connection with couplings A and B.

I claim:

1. In a no-back coupling of the class described, a circular normally stationary drum, relatively angularly movable input and output member coaxial with the drum, a helical friction spring coaxial with the drum means arranged to anchor coils at one end of the spring to the output member in a manner to prevent angular movement of those coils relative thereto, free end coils of the spring being normally in one way locking contact with the drum, means connected with the input member and operative on a free end coil of the spring as a function of a predetermined amount of relative angular movement of the members in one direction to deenergize the spring, said anchoring means including a ring or collar having a circular drum surface against which coils of the spring opposite such free end coil are preloaded for one-way-gripping action, the ring or collar being turnable on a circular surface of the output member coaxial therewith for enabling adjustment, during assembly, of the angular relationship between the input and output members at which deenergization of the spring will commence to take place, and means capable of fastening the ring or collar in angularly adjusted position on the output member against angular movement in either of two directions.

2. A bidirectional no-back coupling assembly comprising coaxial input and output members relatively angularly movable a limited distance in either direction about the axis of a normally stationary circular drum member, two helical friction springs, end to end, preloaded against respective surface portions of the stationary drum member for self-energizing one-way-gripping operation thereon, anchoring collars for the relatively remote end portions of respective springs turnably supported on the longitudinal axis of the drum member and secured to respective end coil portions of the springs to turn therewith, the relatively adjacent end coil portions of the respective springs having circumferentially relatively oppositely facing, spring deenergizing shoulders positionable by relative turning of the springs during assembly of the coupling when the springs are in operating position on the drum member axially thereof, into a variety of adjusted angular relationships about the drum axis, spring deenergizing relatively opposed shoulders rigid with the input member and disposed for contact with the adjusted deenergizing shoulders of the springs circumferentially thereof, and locking means carried by the output member and securing the collars thereto after adjustment thereof against angular movement in either of two opposite directions so as to hold the deenergizing shoulders of the springs normally in adjusted angularly spaced relationship or while no torque is being transmitted through the coupling in the input toward output direction.

3. The coupling construction according to claim 2, wherein the normally stationary drum member comprises a tubular housing containing the helical springs and also the collars and portions of the input and output members, the collars being supported and turnable freely in axial respective end bore portions of the housing and having internal drum surfaces in preloaded relationship to associated coil portions of the springs, and said means operable on the collars comprise rigid members snugly fitting openings which intersect relatively adjacent surface portions of the collars and associated portions of the output member in a manner permanently to lock the collars to the output member.

4. A bidirectional no-back coupling comprising a normally stationary drum, input and output torque transmitting members in relatively telescoping relationship coaxial with the drum, two helical friction springs wound in a common direction and disposed in end to end relationship, means capable of installation during assembly of the coupling so as to anchor the relatively remote end coils of the springs to the output member against angular movement relative thereto in either of two directions in various angularly turned positions of said springs relative to that member about its axis, free end coils of the respective springs extending toward each other and being preloaded to lock against the drum and prevent back drive from the output member to the input member in relatively opposite directions with approximately zero backlash, and deenergizing means for the springs comprising a rigid member interconnecting the input and output members for limited relative angular movement, a portion of the rigid member extending radially of the common axis of the members beyond the peripheral limits of the outer one of the members for deenergizing abutment with relatively adjacent oppositely circumferentially facing shoulders on the free end coil portions of the springs.

5. In a no-back coupling, a normally stationary drum, input and output torque transmitting members coaxial with the drum, a helical friction spring with coils at one end portion normally in self-energizing one way locking contact with the drum, means forming a limited lost motion positive torque transmitting connection between the input and output members, means operating in consequence of angular relative movement between the members to deenergize said coils of the spring, and means for adjustably anchoring coils at the opposite end portion of the spring to one of the members during assembly, said anchoring means comprising a ring secured to that end portion of the spring and turnably mounted on the last mentioned member about its axis, and means connected to that member and capable of frictionally locking the ring thereto in various turned positions of the ring thereon.

6. In a no-back coupling, an internal normally stationary drum, a helical spring having free end coils in self-energizing relation to the drum, an input member and an output member coaxial with the drum, a deenergizing connection between the input member and the free end coils, anchoring means between spring and the output member and comprising a collar turnable in a circular internal surface of the drum and having an internal drum surface, coils of the spring opposite the free end coils being in preloaded relationship to the drum surface of the collar, a ring between axially spaced apart but otherwise relatively adjacent axial surface portions of the collar and the output member, the ring being turnable on the axis of the output member and being connected with one of the coils preloaded in the drum surface of the collar, and a screw threaded to the output member and the collar and positioned to clamp the ring against said axial surface of the output member.

7. A bidirectional no-back coupling, comprising a stationary tubular housing, means interiorly of the housing providing a pair of fixed external drum surfaces, an output rotary member having external drum surface portions aligned with the fixed drum surfaces outwardly therefrom toward respective ends of the housing, similarly wound helical springs in preloaded relationship to the respective output member drum surfaces, attached thereto, and having free end coils in preloaded one-way gripping relationship to respective fixed drum surfaces, an input rotary member telescoping the output member within the housing and having a lost motion positive torque transmitting connection therewith, collars at respective ends of the input member angularly adjustable thereon during assembly of the coupling, means between the collars and input member capable of holding the collars in adjusted positions, and sleeves carried by respective collars around the springs and within the tubular housing and having spring deenergizing connections with the free end coils of respective springs.

8. A no-back coupling of the type comprising a circular normally stationary brake drum, two relatively angularly movable or rotatable members coaxial with the drum, a helical friction spring coaxial with the drum and having coils at one end normally in one way locking frictional contact with the drum, and an abutment connected with one of the members and operative on a circumferential shoulder of a coil at said one end of the spring to deenergize the spring as a function of the relative angular movement of the members, characterized by provision of an anchoring ring or collar exposed at one end of the drum, operatingly fixed to the opposite end of the spring and turnable during assembly of the coupling on a circular mating surface of the other of said members coaxial therewith while the spring is seated against the drum, thereby enabling precise adjustment of the angular relationship of said abutment and circumferential shoulder of the spring, and locking means exposed at said one end of the drum and arranged for operation after effecting of such adjustment to prevent angular movement of the ring or collar out of adjusted position in either of two directions circumferentially of the common axis of said members.

9. The coupling construction according to claim 2, wherein the normally stationary drum member is tubular and provides an internal drum surface embracing the relatively adjacent end coil portions of the helical springs, the collars having internal drum surfaces embracing opposite end coil portions of respective helical springs and against which said opposite end coil portions are radially preloaded or in interference fitting relationship.

10. In a no back coupling of the class described, a normally stationary circular drum, an input torque transmitting member, an output torque transmitting member, both coaxial with the drum, a device connecting said members for limited relative angular movement about their common axis, a helical friction spring having coils at one end in self energizing one-way-locking contact with the drum, means connected with one of the members and operative on a coil of such one end of the spring as a function of predetermined relative angular movement of the members in one direction to de-energize the spring, means connected with the other member and capable of securing the opposite end of the spring thereto against angular movement in opposite directions, one of said means comprising an adjusting ring or collar mounted to turn freely on a circular surface of its associated member coaxial therewith and having a portion thereof accessibly exposed for adjustment during assembly of the coupling and while the spring is in operating position in locking contact with the drum, and a cooperating fastening device simultaneously accessibly exposed and operating during and after assembly of the coupling to secure the ring or collar in adjusted turned position on said circular surface against angular movement thereon in either of two directions.

11. In a no back coupling of the class described, a normally stationary circular drum, an input torque transmitting member, an output torque transmitting member, both coaxial with the drum, a device connecting said members for limited relative angular movement about their common axis, a helical friction spring having coils at one end in self energizing one-way-locking contact with the drum, means connected with one of the members and operative on a coil of such one end of the spring as a function of predetermined relative angular movement of the members in one direction to deenergize the spring, means connected with the other member and capable of securing the opposite end of the spring thereto against angular movement in opposite directions, one of said means comprising an adjusting ring or collar mounted to turn freely on a circular surface of its associated member coaxial therewith and having a portion thereof accessibly exposed for adjustment while the spring is in operating position in locking contact with the drum, and a cooperating fastening device simultaneously accessibly exposed and operating to secure the ring or collar in adjusted turned position on said circular surface against angular movement thereon in either of two directions.

References Cited in the file of this patent

UNITED STATES PATENTS

| | | |
|---|---|---|
| Re. 22,852 | Swift | Mar. 11, 1947 |
| 773,320 | Haase | Oct. 25, 1904 |
| 1,459,223 | Lanzius | June 19, 1923 |
| 1,561,537 | Hayes | Nov. 17, 1925 |
| 2,458,441 | Starkey | Jan. 4, 1949 |
| 2,819,777 | Kosch | Jan. 14, 1958 |